Patented Aug. 27, 1940

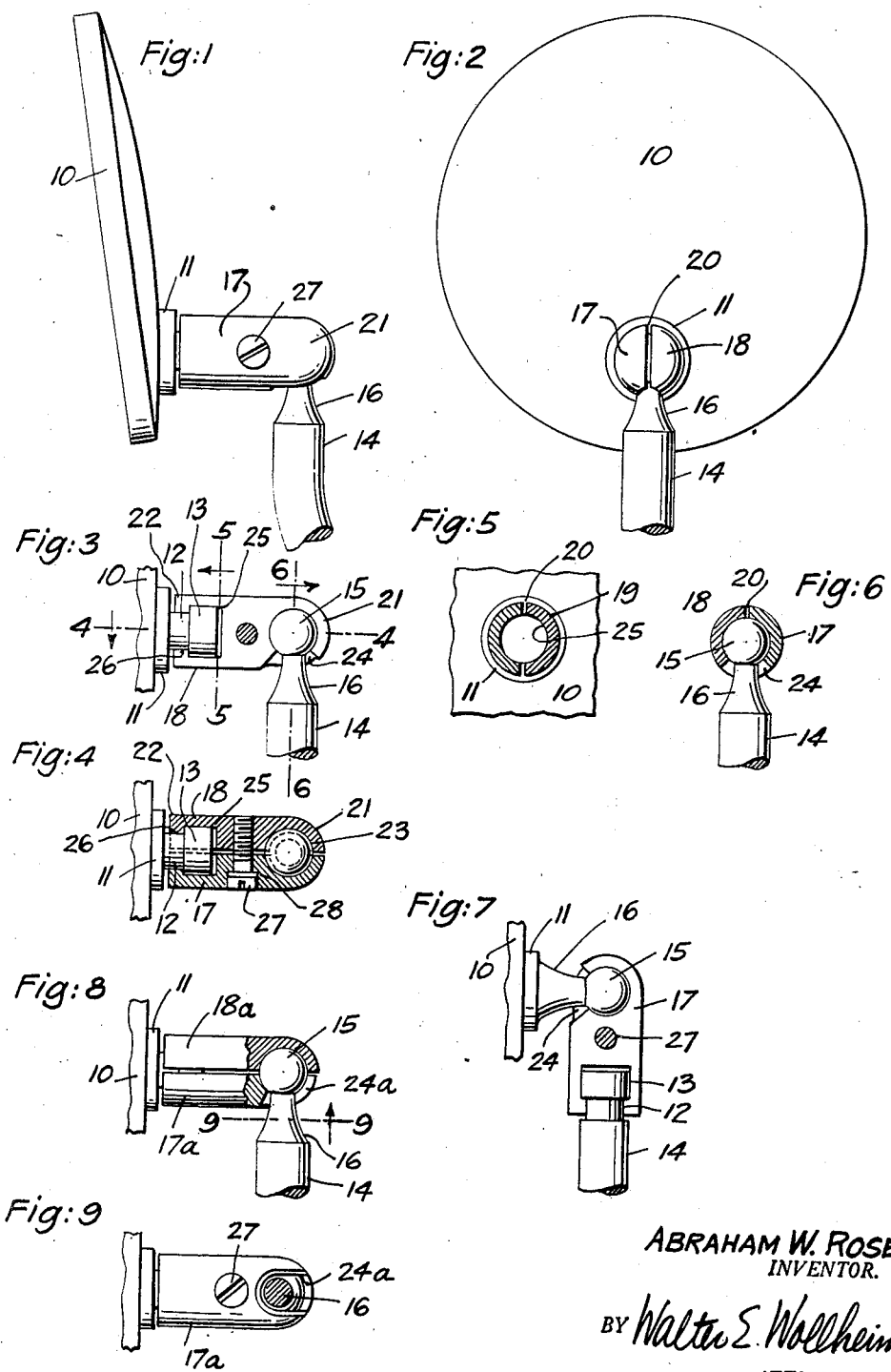

2,213,051

UNITED STATES PATENT OFFICE 2,213,051

UNIVERSAL MIRROR SUPPORT FOR MOTOR VEHICLES

Abraham W. Rosen, New York, N. Y.

Application July 22, 1939, Serial No. 285,893

3 Claims. (Cl. 248—276)

This invention relates to mirrors for motor vehicles or the like of the kind illustrated in Patents #1,816,700 and #2,109,142 issued to me, respectively, on July 28, 1931 and February 22, 1938.

It is the principal object of the invention to provide a mirror of that kind with novel universal supporting means whereby the mirror may be adjusted in any desired plane.

Another object is to provide a structure for the universal joint serving to support the mirror upon a suitable post which is produced at low cost and presents an attractive appearance and which further securely holds the mirror in an adjustable position.

Still another object is to provide the universal joint with a perfectly smooth and symmetrical exterior devoid of objectionable cavities, grooves, recesses or projections which tend to catch dirt or even may injure an operator's hands when quickly passing over it, as in polishing, for instance.

With the above and other objects in view, preferred embodiments of the invention are shown in the accompanying drawing in which Fig. 1 is an elevational view of a mirror connected to a post by means of a universal joint made according to the principles of the invention, a fragmentary portion of the post only being shown;

Fig. 2 is an end view of the assembly shown in Fig. 1;

Fig. 3 shows fragmentary portions of the mirror and post together with the joint, one half of which is removed, the connecting screw of the two halves being shown in section;

Fig. 4 is a longitudinal sectional view along the plane of line 4—4 in Fig. 3 showing both halves of the joint;

Fig. 5 is a cross sectional view along the plane of line 5—5 in Fig. 3 showing also both halves; and Fig. 6 is a similar cross sectional view along the plane of line 6—6 in Fig. 3;

Fig. 7 is a view similar to Fig. 3 showing a modified assembly in which the same joint is used but the styles of connections of the mirror and the post are reversed;

Fig. 8 is a view of a joint, partly in section, corresponding approximately to the view of Fig. 4, with a modified connection of the post to the joint; and Fig. 9 is a sectional view taken along the plane of line 9—9 in Fig. 8.

Like characters of reference denote similar parts throughout the several views and the following specification.

10 is a mirror having a collar 11 from which projects a small cylindrical extension 12 having a somewhat larger terminal 13. 14 is a supporting post terminating in a ball 15 having a tapered shank 16 of smaller diameter than the ball connecting it to the post.

17 and 18 are, respectively, halves of a universal joint. The exteriors of these halves are semi-circular in shape, as clearly shown in Fig. 5 at 19 having their opposed faces perfectly flat at 20. One end of each of the halves 17 and 18 is rounded off at 21, while the other end is substantially flat at 22. Both halves 17 and 18 are hollowed out at their rounded ends semi-spherically at 23 to receive the ball 15 of the post 14. 24 are flared out semi-spherical cavities somewhat larger than and to allow movement of the shank 16 of the post as will be explained more in detail hereafter.

Each of the halves 17 and 18, at its flattened end 22 is recessed semi-circularly to receive the terminal 13 of the mirror at 25 and somewhat smaller at 26 to fit over the extension 12.

Midway between recesses 23 and 25, the half 17 is drilled and recessed and the half 18 tapped to receive preferably a fillister head screw 27 with a lock washer 28 adapted to draw the two halves together and in movable relation to the extension 12 and terminal 13 of the mirror and the ball 15 of the post 14.

The operation of the universal joint in this mirror assembly is quite obvious. After the two halves have been clamped over the mirror and the post in such a way as to allow rotary movement between the extension of the mirror and the ball of the post, the mirror can be rotated about the axis of its extension within the joint, while the joint itself can be swiveled about the ball and at the same time the joint can be tilted up or down as far as the flared clearance recess for the tapered shank below the ball will permit. In this manner almost any necessary angle of plane of mirror with respect to the post can be obtained.

Attention is now especially drawn to the practically solid cylindrical exterior of the joint. By providing this perfectly round surface, it is extremely easy to polish the assembly. No dirt will be caught in projecting corners or in exposed cavities. An operator in quickly passing his hand over the joint does not run the danger of injuring himself owing to the smoothness of the assembly. The joint is especially simple to produce in either die casting or sand casting, resulting in low production costs. It presents an attractive appearance of a streamlined character of particular advantage in fast moving vehicles.

In Fig. 7 which corresponds to Fig. 3 is shown a modified method of assembly to the joint which is the same as the one described and illustrated in Figs. 1 to 7, but the ball 15 and shank 16 are made part of the mirror 10, while extension 12 and terminal 13 are part of post 14. The connections are thus reversed without a change in the joints. The same reference numbers as used heretofore are used in Fig. 7.

In Figs. 8 and 9 is shown a modification of the joint itself. The clearance recess for the shank 16 below the ball 15 of the post 14 is entirely in a half 17a of the joint as shown at 24a. In all other respects, the joint is the same as the one previously described and the same reference numbers are used.

The modifications are introduced solely for the purpose of showing other forms of joints still within the principles of the invention. It is obvious therefore that various other changes in form, proportions and minor details of construction may be resorted to without departing from the principles or sacrificing any of the advantages of the invention as defined in the appended claims.

What I claim as new is:

1. In an adjustable mirror assembly for motor vehicles including a mirror and a supporting post, a flared shank extending from one of the said parts terminating in a ball of larger diameter than the shank, the said post terminating in a small cylindrical extension having an enlarged end, a clamping element connecting the said ball and extension comprising two halves forming a substantially cylindrical member rounded at one end and flat at the other, the said rounded end adapted to receive within it the said ball and having a flared opening to provide clearance and movement for the said shank, the said flat end adapted to receive within it the said extension and enlarged end, and a screw adapted to draw the halves together and relatively movable upon the said ball and extension with enlarged end to permit adjustment of positions of the said mirror and post, the said extension being rotatable in a plane of the longitudinal axis of said clamping element.

2. In an adjustable mirror assembly for motor vehicles including a mirror and a supporting post, a cylindrical extension to the mirror having an enlarged end, the said post terminating in a small flared shank carrying a larger ball, a clamping element connecting the said extension and ball comprising two halves forming a substantially cylindrical member, one end of which being adapted to receive within it the said ball and having a flared opening common to both halves to provide clearance and movement for the said shank, the other end of the said member being adapted to receive within it the said extension with its enlarged end, and a screw adapted to draw the halves together and maintain them in movable relation upon the said ball and extensions to permit adjustment of positions of the said mirror and post, the said extension being rotatable in a plane of the longitudinal axis of said clamping element.

3. In an adjustable mirror assembly for motor vehicles including a mirror and a supporting post, a cylindrical extension to the mirror having an enlarged end, the said post terminating in a small flared shank carrying a larger ball, a clamping element connecting the said extension and ball comprising two halves forming a substantially cylindrical member, one end of which being adapted to receive within it the said ball and having a flared opening in one of the halves only to provide clearance and movement for the said shank, the other end of the said member being adapted to receive within it the said extension with its enlarged end, and a screw adapted to draw the halves together and relatively movable upon the said ball and extension to permit adjustment of positions of the said mirror and post.

ABRAHAM W. ROSEN.